United States Patent
Vizvardi et al.

(10) Patent No.: US 9,022,229 B2
(45) Date of Patent: May 5, 2015

(54) COMPOSITE MEMBRANE WITH COMPATIBLE SUPPORT FILAMENTS

(75) Inventors: Kristof Vizvardi, Budapest (HU); Marcell Marschall, Oroszlany (HU); Andras Gyorgy Pozsgay, Oroszlany (HU); Zoltan A. Fekete, Szárliget (HU)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 13/416,407

(22) Filed: Mar. 9, 2012

(65) Prior Publication Data

US 2013/0233788 A1 Sep. 12, 2013

(51) Int. Cl.
| | |
|---|---|
| B01D 71/48 | (2006.01) |
| B01D 71/34 | (2006.01) |
| B01D 67/00 | (2006.01) |
| B01D 69/08 | (2006.01) |

(52) U.S. Cl.
CPC ............ B01D 69/08 (2013.01); B01D 67/0009 (2013.01); B01D 69/085 (2013.01); B01D 69/087 (2013.01); B01D 71/34 (2013.01); B01D 2315/06 (2013.01); B01D 2325/40 (2013.01)

(58) Field of Classification Search
None
See application file for complete search history.

(56) References Cited

U.S. PATENT DOCUMENTS

| | | | |
|---|---|---|---|
| 2,747,649 A | 5/1956 | Reed | |
| 2,936,482 A | 5/1960 | Kilian | |
| 3,494,121 A | 2/1970 | Bohrer | |
| 3,547,721 A | 12/1970 | Dietzsch | |
| 3,567,666 A | 3/1971 | Berger | |
| 3,615,024 A | 10/1971 | Michaels | |
| 3,673,028 A | 6/1972 | Pearson | |
| 3,676,193 A | 7/1972 | Cooper et al. | |
| 3,705,070 A | 12/1972 | Kim | |
| 3,745,142 A | 7/1973 | Mahlman | |

(Continued)

FOREIGN PATENT DOCUMENTS

| | | |
|---|---|---|
| CA | 986422 | 3/1976 |
| CA | 2288316 | 5/2000 |

(Continued)

OTHER PUBLICATIONS

Search Report and Written Opinion from corresponding PCT Application No. PCT/US2013/025110 dated May 13, 2013.

(Continued)

*Primary Examiner* — Benjamin Kurtz
(74) *Attorney, Agent, or Firm* — Scott Pundsack; Borden Ladner Gervais LLP (57) ABSTRACT

A filtering membrane has a supporting structure comprising filaments and is coated with a dope to produce a polymeric membrane layer. Some or all of the filaments comprise a second polymer that is soluble or swellable in a solvent of the dope. The supporting structure may be braided with yarns. One or more yarns may comprise filaments comprising the second polymer. In one example, a braided tubular support is coated with a dope based on PVDF in NMP. Some or all of the yarns of the braid are made of bi-component core-sheath PET-PVDF filaments. With as few as 4% of the yarns in the braid made of the bicomponent filaments, peel strength and pull force of the membrane is improved relative to a braid made entirely of PET yarns. In experimental examples, unpeelable composite membranes were produced. The membrane may be used, for example, for water or wastewater filtration applications.

4 Claims, 7 Drawing Sheets

(56) References Cited

U.S. PATENT DOCUMENTS

| | | |
|---|---|---|
| 3,816,231 A | 6/1974 | Marshall |
| 3,849,241 A | 11/1974 | Butin et al. |
| 3,948,781 A | 4/1976 | Brun et al. |
| 3,984,328 A | 10/1976 | Brun et al. |
| 4,020,230 A | 4/1977 | Mahoney et al. |
| 4,029,265 A | 6/1977 | Piper |
| 4,061,821 A | 12/1977 | Hayano et al. |
| 4,115,492 A | 9/1978 | Mahoney et al. |
| 4,247,498 A | 1/1981 | Castro |
| 4,253,936 A | 3/1981 | Leysen et al. |
| 4,274,539 A | 6/1981 | Rabeneck et al. |
| 4,299,083 A | 11/1981 | Igel et al. |
| 4,335,193 A | 6/1982 | Doi et al. |
| 4,340,480 A | 7/1982 | Pall et al. |
| 4,384,047 A | 5/1983 | Benzinger et al. |
| 4,399,035 A | 8/1983 | Nohmi et al. |
| 4,405,688 A | 9/1983 | Lowery et al. |
| 4,406,850 A | 9/1983 | Hills |
| 4,541,981 A | 9/1985 | Lowery et al. |
| 4,631,128 A | 12/1986 | Coplan et al. |
| 4,664,681 A | 5/1987 | Anazawa et al. |
| 4,666,607 A | 5/1987 | Josefiak et al. |
| 4,702,836 A | 10/1987 | Mutoh et al. |
| 4,707,265 A | 11/1987 | Barnes, Jr. et al. |
| 4,741,829 A | 5/1988 | Takemura et al. |
| 4,764,320 A | 8/1988 | Chan et al. |
| 4,919,856 A | 4/1990 | Anazawa et al. |
| 4,957,943 A | 9/1990 | McAllister et al. |
| 5,011,588 A | 4/1991 | Rao et al. |
| 5,013,339 A | 5/1991 | Mahoney et al. |
| 5,022,990 A | 6/1991 | Doi et al. |
| 5,032,282 A | 7/1991 | Linder et al. |
| 5,034,129 A | 7/1991 | Ten Hove |
| 5,066,401 A | 11/1991 | Muller et al. |
| 5,139,529 A | 8/1992 | Seita et al. |
| 5,143,312 A | 9/1992 | Baurmeister |
| 5,151,191 A | 9/1992 | Sunaoka et al. |
| 5,168,005 A | 12/1992 | Keating |
| 5,171,493 A | 12/1992 | Aptel et al. |
| 5,209,852 A | 5/1993 | Sunaoka et al. |
| 5,232,597 A | 8/1993 | Eguchi |
| 5,232,642 A | 8/1993 | Kamo et al. |
| 5,238,562 A | 8/1993 | Rogut |
| 5,240,610 A | 8/1993 | Tani et al. |
| 5,271,883 A | 12/1993 | Timmons et al. |
| 5,284,583 A | 2/1994 | Rogut |
| 5,294,338 A | 3/1994 | Kamo et al. |
| 5,303,550 A | 4/1994 | Setzer |
| 5,328,610 A | 7/1994 | Rogut |
| 5,332,498 A | 7/1994 | Rogut |
| 5,336,298 A | 8/1994 | Quinn et al. |
| 5,374,453 A | 12/1994 | Swei et al. |
| 5,376,273 A | 12/1994 | Pacheco et al. |
| 5,380,477 A | 1/1995 | Kent et al. |
| 5,385,777 A | 1/1995 | Higuchi et al. |
| 5,392,588 A | 2/1995 | Morrison |
| 5,435,955 A | 7/1995 | Kamei et al. |
| 5,470,659 A | 11/1995 | Baumgart et al. |
| 5,472,607 A | 12/1995 | Mailvaganam et al. |
| 5,474,680 A | 12/1995 | Eguchi |
| 5,489,406 A | 2/1996 | Beck et al. |
| 5,497,608 A | 3/1996 | Matsumoto et al. |
| 5,547,756 A | 8/1996 | Kamo et al. |
| 5,582,913 A | 12/1996 | Simons |
| 5,637,385 A | 6/1997 | Mizuki et al. |
| 5,651,888 A | 7/1997 | Shimizu et al. |
| 5,656,167 A | 8/1997 | Martz |
| 5,709,735 A | 1/1998 | Midkiff et al. |
| 5,716,689 A | 2/1998 | Rogut |
| 5,753,351 A | 5/1998 | Yoshida et al. |
| 5,782,959 A | 7/1998 | Yang et al. |
| 5,783,608 A | 7/1998 | Sugo et al. |
| 5,804,128 A | 9/1998 | Ogata et al. |
| 5,882,461 A | 3/1999 | Rogut |
| 5,888,605 A | 3/1999 | Hachisuka et al. |
| 5,914,039 A | 6/1999 | Mahendran et al. |
| 5,972,501 A | 10/1999 | Ohmory et al. |
| 6,015,495 A | 1/2000 | Koo et al. |
| 6,024,872 A | 2/2000 | Mahendran et al. |
| 6,048,641 A | 4/2000 | Ohmory et al. |
| 6,077,376 A | 6/2000 | Kataro et al. |
| 6,083,393 A | 7/2000 | Wu et al. |
| 6,090,731 A | 7/2000 | Pike et al. |
| 6,114,017 A | 9/2000 | Fabbricante et al. |
| 6,127,433 A | 10/2000 | Sugo et al. |
| 6,183,640 B1 | 2/2001 | Wang |
| 6,245,239 B1 | 6/2001 | Cote et al. |
| 6,264,044 B1 | 7/2001 | Meyering et al. |
| 6,273,271 B1 | 8/2001 | Moya |
| 6,280,791 B1 | 8/2001 | Meyering et al. |
| 6,354,443 B1 | 3/2002 | Moya |
| 6,354,444 B1 | 3/2002 | Mahendran et al. |
| 6,454,943 B1 | 9/2002 | Koenhen |
| 6,465,094 B1 | 10/2002 | Dugan |
| 6,495,663 B1 | 12/2002 | Rothbard et al. |
| 6,559,192 B2 | 5/2003 | Maccone et al. |
| 6,562,879 B1 | 5/2003 | Hatsuda et al. |
| 6,592,759 B2 * | 7/2003 | Rabie et al. ........... 210/321.61 |
| 6,635,204 B2 | 10/2003 | Tanaka et al. |
| 6,746,627 B2 | 6/2004 | Niu et al. |
| 6,792,744 B2 | 9/2004 | Feuerlohn et al. |
| 6,802,971 B2 | 10/2004 | Gorsuch et al. |
| 6,890,435 B2 | 5/2005 | Ji et al. |
| RE39,176 E | 7/2006 | Dutt |
| 7,081,273 B2 | 7/2006 | Ji |
| 7,165,682 B1 | 1/2007 | Ji |
| 7,172,075 B1 | 2/2007 | Ji |
| 7,185,597 B1 | 3/2007 | Phillips et al. |
| 7,247,238 B2 | 7/2007 | Mullette et al. |
| 7,267,872 B2 | 9/2007 | Lee et al. |
| 7,306,105 B2 | 12/2007 | Shinada et al. |
| 7,413,804 B2 | 8/2008 | Lee et al. |
| 7,441,667 B2 | 10/2008 | Galvin et al. |
| 7,563,376 B2 | 7/2009 | Oishi |
| 7,776,214 B2 | 8/2010 | Saito et al. |
| 7,807,221 B2 | 10/2010 | Shinada et al. |
| 7,861,869 B2 | 1/2011 | Beckers et al. |
| 7,909,177 B2 | 3/2011 | Lee et al. |
| 2002/0046970 A1 | 4/2002 | Murase et al. |
| 2002/0090690 A1 | 7/2002 | Eddleman et al. |
| 2002/0111674 A1 | 8/2002 | Chouinard et al. |
| 2002/0155289 A1 | 10/2002 | Cistone et al. |
| 2003/0094409 A1 | 5/2003 | Minegishi et al. |
| 2003/0098275 A1 | 5/2003 | Mahendran et al. |
| 2003/0107150 A1 | 6/2003 | Hamanaka et al. |
| 2003/0192826 A1 | 10/2003 | Wang et al. |
| 2003/0197308 A1 | 10/2003 | Montoya |
| 2004/0073300 A1 | 4/2004 | Chouinard et al. |
| 2004/0078903 A1 | 4/2004 | Bruning et al. |
| 2004/0136894 A1 | 7/2004 | Yoshizawa et al. |
| 2005/0124249 A1 | 6/2005 | Uribarri |
| 2005/0189292 A1 | 9/2005 | Ward et al. |
| 2005/0205488 A1 | 9/2005 | Shinada et al. |
| 2006/0000766 A1 | 1/2006 | Ji |
| 2006/0175243 A1 | 8/2006 | Mahendran et al. |
| 2007/0084794 A1 | 4/2007 | Morikawa et al. |
| 2007/0262017 A1 | 11/2007 | Shinada et al. |
| 2008/0023125 A1 | 1/2008 | Arnold et al. |
| 2008/0210623 A1 | 9/2008 | McMahon et al. |
| 2008/0241451 A1 | 10/2008 | Beckers et al. |
| 2008/0292823 A1 | 11/2008 | Lee et al. |
| 2008/0305290 A1 | 12/2008 | Lee et al. |
| 2009/0068428 A1 | 3/2009 | Shinoda et al. |
| 2009/0314708 A1 | 12/2009 | Yeom |
| 2010/0024631 A1 | 2/2010 | Lee et al. |
| 2011/0114553 A1 | 5/2011 | Teramachi et al. |
| 2012/0018371 A1 | 1/2012 | Cote |
| 2012/0097604 A1 | 4/2012 | Cote et al. |
| 2012/0156485 A1 | 6/2012 | Palinkas et al. |
| 2012/0164447 A1 | 6/2012 | Kohinata |
| 2013/0153490 A1 * | 6/2013 | Pedersen et al. ......... 210/500.23 |
| 2013/0158007 A1 | 6/2013 | Mickle et al. |

(56) References Cited

U.S. PATENT DOCUMENTS

| | | | |
|---|---|---|---|
| 2013/0168007 A1* | 7/2013 | Cote et al. ................... | 156/85 |
| 2013/0233788 A1 | 9/2013 | Vizvardi et al. | |

FOREIGN PATENT DOCUMENTS

| | | |
|---|---|---|
| CA | 2474625 | 8/2003 |
| CA | 2478445 | 9/2003 |
| CA | 2478831 | 9/2003 |
| CA | 2630418 | 6/2007 |
| CH | 507012 | 5/1971 |
| CZ | 286263 B6 | 2/2000 |
| DE | 4142417 | 6/1992 |
| DE | 10211051 | 10/2003 |
| EP | 0241995 | 10/1987 |
| EP | 0761292 A1 | 3/1997 |
| EP | 0819467 | 1/1998 |
| EP | 0998972 | 5/2000 |
| EP | 1193292 | 4/2002 |
| EP | 1236503 | 9/2002 |
| EP | 1424157 A1 | 6/2004 |
| EP | 1658889 A1 | 5/2006 |
| EP | 0998972 B1 | 4/2007 |
| EP | 2301654 | 3/2011 |
| EP | 2301654 A1 | 3/2011 |
| FR | 1511581 | 2/1968 |
| FR | 2616812 | 12/1988 |
| FR | 2336962 | 7/1997 |
| GB | 1325672 A | 8/1973 |
| GB | 1374704 | 11/1974 |
| GB | 2041821 | 9/1980 |
| JP | 53-039982 | 9/1974 |
| JP | 52137026 | 11/1977 |
| JP | 53028084 | 3/1978 |
| JP | 55137209 | 10/1980 |
| JP | 57005914 | 1/1982 |
| JP | 57-028139 | 2/1982 |
| JP | 58-004810 | 1/1983 |
| JP | 58-049408 | 3/1983 |
| JP | 58-093734 | 6/1983 |
| JP | 59196706 | 11/1984 |
| JP | 60137402 | 7/1985 |
| JP | 60139815 | 7/1985 |
| JP | 61-146811 | 7/1986 |
| JP | 62001404 | 1/1987 |
| JP | 62019206 | 1/1987 |
| JP | 62045318 | 2/1987 |
| JP | 62079806 | 4/1987 |
| JP | 62-133190 | 6/1987 |
| JP | 64-014315 | 1/1989 |
| JP | 2107318 | 4/1990 |
| JP | 2268816 | 11/1990 |
| JP | 04-265132 | 9/1992 |
| JP | 4265133 | 9/1992 |
| JP | 4293529 | 10/1992 |
| JP | 5301031 | 11/1993 |
| JP | 06-015152 | 1/1994 |
| JP | 06-246139 | 9/1994 |
| JP | 6246140 | 9/1994 |
| JP | 07-080263 | 3/1995 |
| JP | 07-116483 | 5/1995 |
| JP | 7157580 | 6/1995 |
| JP | 8165396 | 6/1996 |
| JP | 52082682 | 7/1997 |
| JP | 10-323546 | 12/1998 |
| JP | 11-319519 | 11/1999 |
| JP | 11348131 B2 | 12/1999 |
| JP | 2000-093768 | 4/2000 |
| JP | 2000288365 | 10/2000 |
| JP | 2001-062258 | 3/2001 |
| JP | 2003320584 A | 11/2003 |
| JP | 2008-114180 | 5/2008 |
| KR | 20040038473 A | 5/2004 |
| KR | 20110089621 A | 8/2011 |
| NL | 1010458 C2 | 4/2000 |
| TW | 200946323 A | 11/2009 |
| WO | WO 93/23153 | 11/1993 |
| WO | WO 99/01207 | 1/1999 |
| WO | 2009142279 | 11/1999 |
| WO | WO 00/78437 | 12/2000 |
| WO | WO 02/34373 | 5/2002 |
| WO | WO 03/059496 | 7/2003 |
| WO | WO 03/068374 | 8/2003 |
| WO | WO 03/076055 | 9/2003 |
| WO | WO 03/076056 | 9/2003 |
| WO | WO 03/097221 | 11/2003 |
| WO | WO 2004/009221 | 1/2004 |
| WO | WO 2004/089520 | 10/2004 |
| WO | WO 2005/002712 | 1/2005 |
| WO | 2005061081 | 7/2005 |
| WO | 2005082503 A1 | 9/2005 |
| WO | 2005-113218 A1 | 12/2005 |
| WO | 2005118116 A1 | 12/2005 |
| WO | WO 2006053406 | 5/2006 |
| WO | WO 2006063426 | 6/2006 |
| WO | WO 2007116072 | 10/2007 |
| WO | WO 2008066340 | 6/2008 |
| WO | WO 2009/142279 * | 11/2009 |
| WO | 2010062454 | 6/2010 |
| WO | WO 2010/081228 | 7/2010 |
| WO | 2010108285 A1 | 9/2010 |
| WO | WO 2010/108285 | 9/2010 |
| WO | 2010148517 A1 | 12/2010 |
| WO | WO 2010/148517 | 12/2010 |
| WO | 2012036935 | 3/2012 |

OTHER PUBLICATIONS

Jie Liu, Pingli Li et al. Preparation of PET threads reinforced PVDF hollow fiber membrane, Desalination, vol. 249, Issue 2, Dec. 15, 2009, pp. 453-457.
Search Report and Written Opinion from PCT/US2011/063332 dated Jul. 31, 2012.
Search Report and Written Opinion from PCT/US2011/050479 dated Nov. 25, 2011.
Caplan et al., Formation of microporous Teflon PFA membranes via thermally induced phase separation, Journal of Membrane Science, 130 (1997) p. 219-237.
Choi et al., Fabrication and characterization of multi-walled carbon nanotubes/polymer blend membranes, Journal of Membrane Science 284 (2006) p. 406-415.
Choi et al., Modification of Performances of Various Memranes Using MWNTs as a Modifier, Macromol. Symp. 2007, 249-250, p. 610-617.
English language abstact of JP 11-319519 to Nitto Denko Corp, published Nov. 24, 1999.
English language abstract of JP 04-265132 to UBE Ind Ltd, published Sep. 21, 1992.
English language abstract of JP 04265133 to UBE Ind Ltd, published Sep. 21, 1992.
English language abstract of JP 04293529 to UBE Ind Ltd, published Oct. 19, 1992.
English language abstract of JP 06-015152 to Tokuyama Soda Co Ltd, published Jan. 25, 1994.
English language abstract of JP 06-246139 to Dainippon Ink & Chem Inc, published Sep. 6, 1994.
English language abstract of JP 06246140 to Dainippon Ink & Chem Inc, published Sep. 6, 1994.
English language abstract of JP 07-080263 to Mitsubishi Rayon Co Ltd, published Mar. 28, 1995.
English language abstract of JP 07-116483 to Dainippon Ink & Chem Inc, published May 9, 1995.
English language abstract of JP 07157580 to Kawamura Inst of Chem Res Dainippon Ink & Chem Inc, published Jun. 20, 1995.
English language abstract of JP 08165396 to Kurabe Ind Co Ltd, published Jun. 25, 1996.
English language abstract of JP 10-323546 to Nitto Denko Corp, published Dec. 8, 1998.
English language abstract of JP 11-319519 to Nitto Denko Corp published Nov. 24, 1999.

(56) References Cited

OTHER PUBLICATIONS

English language abstract of JP 2000-093768 to Nok Corp, published Apr. 4, 2000.
English language abstract of JP 2000288365 to Torary Ind Inc, published Oct. 17, 2000.
English language abstract of JP 2001-062258, to Mitsubishi Rayon Co. Ltd, published Mar. 2001.
English language abstract of JP 2008114180 to Mitsubishi Rayon Co Ltd, published May 22, 2008.
English language abstract of JP 2107318 to Daicel Chem, published Apr. 19, 1990.
English language abstract of JP 2268816 to Mitsubishi Rayon Co, published Nov. 2, 1990.
PCT Search Report dated Jun. 14, 2010 issued in connection with PCT Application No. PCT/CA2010/000469 which was filed on Mar. 26, 2010.
English language abstract of JP 52082682 to Asahi Chemical Ind, published Jul. 11, 1997.
English language abstract of JP 52137026 to Toyobo Co Ltd, published Nov. 16, 1977.
English language abstract of JP 5301031 to Daicel Chem, published Nov. 16, 1993.
English language abstract of JP 53028084 to Nitto Electric Ind Co, published Mar. 15, 1978.
English language abstract of JP 53-039982 to Kunyu, published Sep. 3, 1974.
English language abstract of JP 55137209 to Mitsubishi Rayon Co Ltd, published Oct. 25, 1980.
English language abstract of JP 57005914 to Mitsubishi Rayon Co Ltd, published Jan. 12, 1982.
English language abstract of JP 57-028139 to Asahi Chem Ind Co Ltd, published Feb. 15, 1982.
English language abstract of JP 58-004810 to Toyobo Co Ltd, published Jan. 12, 1983.
English language abstract of JP 58-049408 to Nitto Electric Ind Co Ltd, published Mar. 23, 1983.
English language abstract of JP 58-093734 to Asahi Kasei Kogyo KK, published Jun. 3, 1983.
English language abstract of JP 59196706 to Dainippon Ink & Chem Inc Kawamura Inst of Chem Res, published Nov. 8, 1984.
English language abstract of JP 60137402 to Mitsubishi Rayon Co Ltd, published Jun. 22, 1985.
English language abstract of JP 60139815 to Mitsubishi Rayon Co Ltd, published Jul. 24, 1985.
English language abstract of JP 61-146811 to Ube Ind Ltd, published Jul. 4, 1986.
English language abstract of JP 62001404 to Mitsubishi Rayon Co, published Jan. 7, 1987.
English language abstract of JP 62019206 to Dainippon Ink & Chem Inc, published Jan. 28, 1987.
English language abstract of JP 62045318 to Dainippon Ink & Chem Inc, published Feb. 27, 1987.
English language abstract of JP 62079806 to Ube Ind Ltd, published Apr. 13, 1987.
English language abstract of JP 62-133190 to Toagosei Chem Ind Co Ltd, published Jun. 16, 1987.
English language abstract of JP 64-014315 to Mitsubishi Rayon Co Ltd, published Jan. 18, 1989.
Ramaswamy et al., Fabication of poly (ECTFE) membranes via thermally induced phase separation, Journal of Membrane Science, 210 (2002) p. 175-180.
Lin et al., Microporous PVDF membrane formation by immersion precipitation from water/TEP/PVDF system, Desalination, 145 (2002) p. 25-29.
Lloyd et al., Microporous membrane formation via thermally-induced phase separation. II. Liquid-liquid phase separation, Journal of Membrane Science, 64 (1991) p. 1-11.
Lloyd, Douglas R., Microporous membrane formation via thermally induced phase separation. I. Solid-liquid phase separation, Journal of Membrane Science, 52 (1990) p. 239-261.
Murata Manufacturing Co, English language abstract of JP11348131, published Dec. 21, 1999.
Tsujino, Jiromaru et al., Welding of Flat Copper Braid Wire Specimens Using Ultrasonic Complex Vibration—Direct Machining of Terminal Parts on Flat Braided Wires, Ultrasonics Symposium, IUS 2008. IEEE, Nov. 2-5, 2008.
Elke, English language abstract of EP1424157, published Jun. 2, 2004.
Inoue Shoten KK, English language abstract of JP2003320584, published Nov. 11, 2003.
Sung Cheol, English language abstract of KR20110089621, published Aug. 9, 2011.
Guo-Chang, English language abstract of TW200946323, published Nov. 16, 2009.
Schunk Ultraschalltechnik GMGH, English language abstract of CZ286263, published Feb. 16, 2000.
PCT Search Report and Written Opinion dated Jun. 21, 2013 from PCT Application No. PCT/US2013/026979.
PCT Search Report and Written Opinion dated Mar. 28, 2013 from PCT Application No. PCT/US2012/065648.
PCT Search Report dated Oct. 16, 2013 from PCT Application No. PCT/US2013/053891.

* cited by examiner

COMPOSITE MEMBRANE WITH COMPATIBLE SUPPORT FILAMENTS

FIELD

This specification relates to filtering membranes.

BACKGROUND

The following discussion is not an admission that anything discussed below is common general knowledge or background knowledge of a person skilled in the art.

U.S. Pat. No. 5,472,607 to Mahendran et al. describes a hollow fiber membrane comprising a braided tubular support coated on its outer surface with an asymmetric semipermeable film of polymer. Voids in the braided support are small enough to inhibit substantial penetration of a membrane forming dope. The polymer film extends over less than 33% of the outer portion of the braid's cross-sectional area. In one example, a tubular braid of glass fibers was coated with a dope of polyvinylidene-difluoride (PVDF) in N-methyl-2-pyrrolidone (NMP). The braid had an inner diameter of 1.0 mm and an outer diameter of 1.5 mm. The complete microfiltration (MF) membrane had an outside diameter of 1.58 mm.

U.S. Pat. No. 6,354,444 to Mahendran et al. describes microfiltration (MF) or ultrafiltration (UF) membranes supported on a tubular braid. Various physical characteristics of a preferred braid are described. The braid may be made, for example, from polyesters or nylons. In a comparison test, membranes made of a PVDF in NMP dope coated onto a polyester braid were found to break less frequently than membranes with a glass fiber braid when used in an aerated, immersed microfiltration module.

Membranes generally as described in U.S. Pat. No. 6,354,444 are used in ZeeWeed membrane modules sold by GE Water and Process Technologies. These modules, originally developed by Zenon Environmental Inc., are possibly the most successful immersed membrane products for use in membrane bioreactors (MBR) ever made. However, although the membranes do not break, these membranes still occasionally suffer failures that occur when the membrane coating peels off of the braided support in harsh operating conditions. These delamination failures occur particularly at high stress points where the membranes enter the resin potting blocks. Although the fiber does nor break, delamination causes a breach in the rejection capability of the membrane.

In U.S. Pat. No. 7,807,221, Shinada et al. attempt to provide increased adhesion between a membrane material and a supporting braid by applying the membrane material in two separate coating layers. In U.S. Pat. No. 7,909,177, Lee et al. attempt to increase peeling strength by using fine filaments in the braid and adding stabilizing agents to the membrane dope to avoid forming large macro-void pores near the membrane to braid interface.

INTRODUCTION

The following introduction is intended to introduce the reader to the detailed description and not to limit or define any claimed invention.

This specification describes an alternative supporting structure for a filtering membrane. The supporting structure comprises filaments. The supporting structure is coated with a polymeric membrane layer to produce a supported membrane. The polymeric membrane layer does not completely penetrate through the supporting structure. Some or all of the filaments of the supporting structure comprise a polymer that is soluble or swellable in a solvent of the membrane layer polymer used to make a membrane casting polymer solution, alternatively called dope. The membrane may be used in any filtration application including, for example, drinking water filtration, tertiary filtration or mixed liquor filtration in a membrane bioreactor.

A membrane may be supported on a braided or woven support which has a first supporting polymer and one or more carriers or yarns comprising filaments having a second supporting polymer. The second supporting polymer is soluble or swellable in a solvent of a membrane dope. The second supporting polymer preferably also has a high affinity for a membrane forming polymer. Optionally, the second supporting polymer may be the same as the membrane forming polymer. Optionally, one or more carriers or yarns may consist essentially entirely of filaments comprising the second supporting polymer. The filaments comprising the second supporting polymer may be bi-component filaments of the second supporting polymer and either the first supporting polymer or a third supporting polymer. The support is not fully embedded in the membrane polymer layer.

The detailed description describes, as an example, a braid supported hollow fiber membrane. Polyester (PET) is used to make the braided support because of its high tensile strength. Polyvinylidene difluoride (PVDF) is used for the membrane layer for its excellent chemical resistance. The membrane layer was produced by coating the braid with a dope based on PVDF in N-methyl-2-pyrrolidone (NMP). However, PVDF has low adhesion to polyester and the braid is not fully embedded in the membrane layer. When PET yarns were substituted with yarns made of filaments that comprise PVDF, the peel strength of the membrane improved. More than half of the cross-sectional area of the braid was made of PET and so the membrane retained sufficient tensile strength. However, replacing as little as 4% of the yarns in the braid with a yarn of PET/PVDF core-sheath filaments provided an unpeelable membrane.

Without intending to be limited to any particular theory, the improvement in peel strength appears to be based on two mechanisms. Firstly, the PVDF filaments have a high affinity for the PVDF based dope, which causes enhanced penetration of the dope into the braid along or into the yarn with filaments comprising PVDF. Secondly, the PVDF filaments partially or completely dissolve when exposed to the NMP, which anchors the penetrating dope into the support structure.

DETAILED DESCRIPTION

Figure 1:
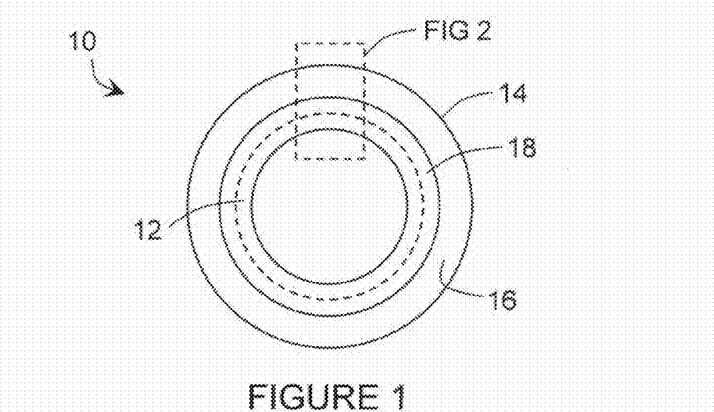
FIG. 1 is a schematic representation of a cross section of a membrane.

FIG. 1 shows a schematic cross section of a supported membrane 10. The membrane 10 has a supporting structure 12 and a polymeric membrane layer 14. The membrane layer 14 includes an upper region 16 that lies generally on top of the supporting structure 12. Optionally, the membrane layer 14 may also have a penetrating region 18 that is located within the supporting structure 12. The penetrating region 18, if present, may extend through the entire thickness of the supporting structure 12 but preferably extends through one half or less of the thickness of the supporting structure. The membrane 10 in FIG. 1 is a hollow fiber membrane, typically having an outer diameter of about 3 mm or less. Other membranes 10 may be in the form of flat sheets or tubes, the tubes typically having a diameter of about 5 mm or more.

Figure 2:
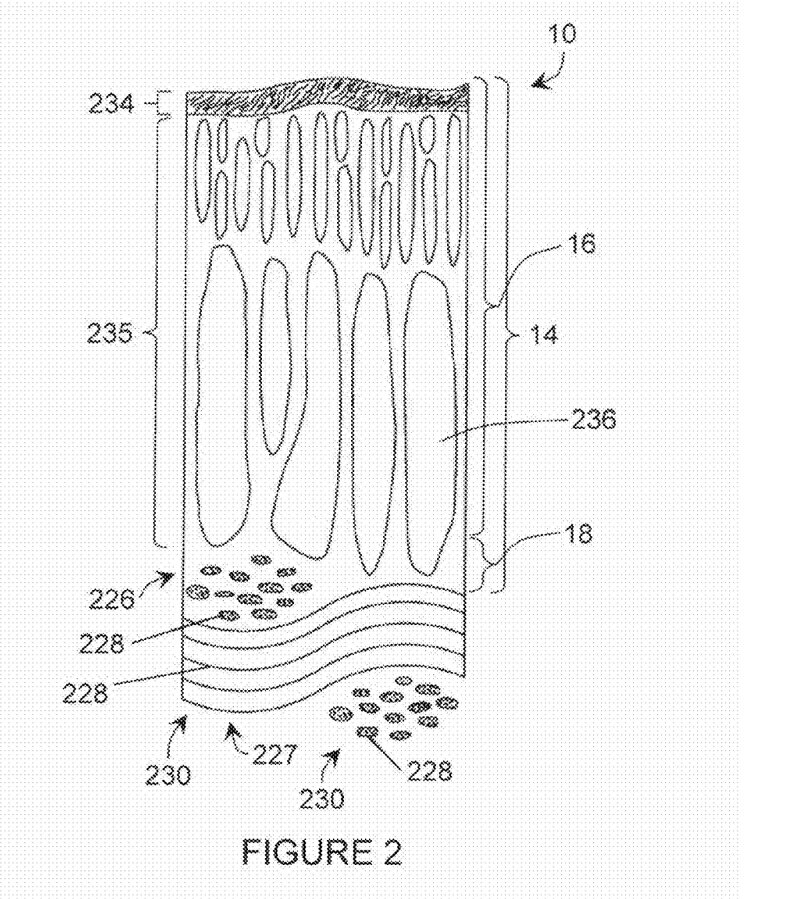
FIG. 2 is an enlarged drawing of a portion of the membrane of FIG. 1.

FIG. 2 shows an enlargement of part of the cross section of membrane 10. The supporting structure 12 defines an outer surface 226 and an inside surface 227. Both of the surfaces 226, 227 are irregular and broken up with openings to pores or passages through the supporting structure 12. The support 12 may be between about 0.1 mm and 0.5 mm thick. The upper region 16 of the membrane 10 may be between about 50 microns and 230 microns thick. In the case of a hollow fiber membrane, the inner surface 227 may define a lumen or bore of the membrane 10, which may have a nominal diameter of between about 0.25 mm and 2.3 mm, and the outer diameter of the supporting structure 12 may be between about 0.6 mm and about 2.5 mm.

The supporting structure 12 is made up of filaments 228. Optionally, these filaments may be collected together into yarns 230. The yarns 230 may be collected together into a sheet or tube, for example by braiding. As used herein, the term "braided" and related terms includes knitted and woven structures and their related terms. Alternatively, the supporting structure 12 may be made up of filaments 228 directly as in, for example, a non-woven substrate such as a needle-punched, spun-bond or melt-blown substrate. In the case of a hollow fiber membrane, a braided tube may be made from about 16 to 96 yarns or ends braided at between about 5 and 100 picks per inch.

Spaces, or voids, are present on the outer surface 226 of the supporting structure 12 between adjacent or crossing filaments 228, or between yarns 230 if the filaments 228 are arranged in yarns 230. The voids may have a median or average area that is similar in area to a circular opening with a diameter between about 10 microns and 100 microns. This range may be adjusted to suit the membrane dope. However, voids less than 10 microns in size may interfere with permeate flux through the membranes. Voids larger than 100 microns in size may allow excessive dope penetration, which could result in the membrane lumen being blocked or the membrane layer 14 being thick. A thick membrane layer 14 consumes excessive amounts of membrane dope and may also cause reduced flux. Large voids also tend to coincide with there being fewer filaments 228, which may reduce adhesion between the supporting structure 12 and the membrane layer 14.

In FIG. 2, the membrane layer 14 is asymmetric with an integral skin 234 over a supporting region 235. The skin 234 is a thin layer that is dense or has small pores that define the filtration range of the membrane 10. The nominal pore size may be, for example, between about 10 nm and 1 micron in size, with some pores larger and smaller than the nominal size. The supporting region may contain macrovoids 236. Suitable membrane layers and methods of making them are described, for example, in International Publication Number WO 2010/062454 A1, which is incorporated by reference. Other membrane structures may also be used.

The membrane 10 is produced by casting one or more membrane dopes onto the supporting structure 12. The dope generally comprises a film-forming polymer and a solvent for the polymer, optionally with other additives such as non-solvents, weak non-solvents, and hydrophilic additives. The film-forming polymer forms the membrane layer 14 after it comes out of solution with the solvent.

Suitable film-forming polymers include, for example, polysulfone, polyethersulfone, polyether ether ketone, polyvinyl chloride (PVC), polyvinylidene dichloride (PVDC), chlorinated polyvinylchloride (CPVC), polyvinylidene difluoride (PVDF), polyvinylfluoride (PVF), other fluoro polymers or co-polymers, cellulose acetate, cellulose nitrate, cellulose triacetate, cellulose butyrate, polyacrylonitrile, sulfonated polyether ether ketone, sulfonated polysulfone, sulfonated polyethersulfone, polyimides, polyamides, polymethyl methacrylate, polystyrene, or blends or co-polymers of the above.

Solvents most commonly used in membrane dopes include pentane, hexane, cyclohexane, ethyl acetate, dichloroethane, chloroform, dimethylformamide (DMF), dimethylacetamide (DMAc), N-methyl-2-pyrrolidone (NMP), N-ethylpyrrolidone (NET), formamide, triethylphosphate (TEP), y-butyrolactone, e-caprolactam, dimethylsulfoxide (DMSO), tetrahydrofuran (THF), acetone, pyperidine, imidazole, and sulfuric acid.

Generally speaking, the dope is introduced into a casting device, such as a coating nozzle, casting head or casting knife, at a flow rate correlated to the speed of the supporting structure relative to the casting device. The dope flow rate is chosen to provide a desired thickness of the membrane layer 14.

Figure 3:
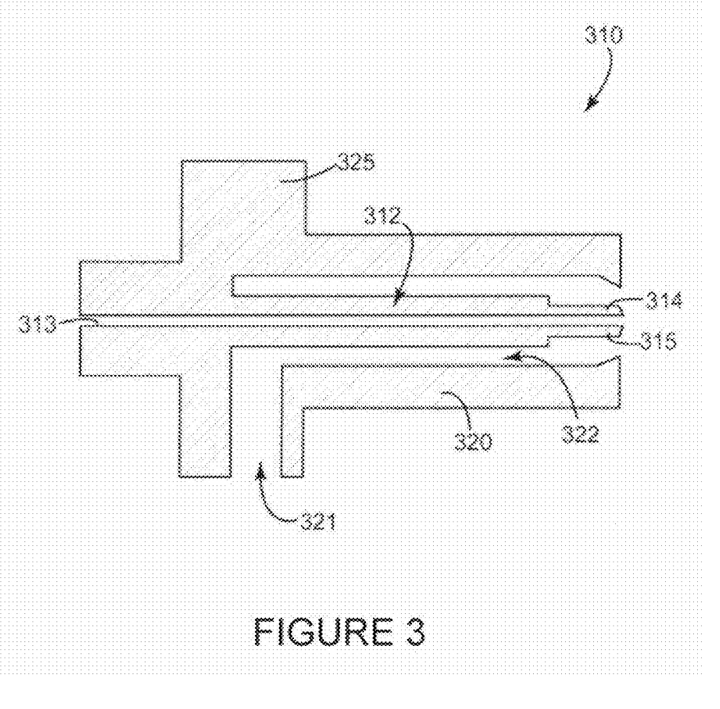
FIG. 3 is a cross-sectional view along a longitudinal axis of a coating nozzle used to produce a hollow fiber membrane.

For example, FIG. 3 shows a cross sectional view of a coating nozzle 310 that may be used to form a polymeric membrane film on a tubular braid to produce a hollow fiber membrane. The nozzle 310 comprises an inner barrel 312 having an internal bore 313 through which the tubular support is advanced into an axial bore 314 of a nipple 315. The nipple 315 may be integral with the barrel 312, or may be secured into an end of a separate barrel 312. The bore 314 provides a rounding orifice to help the tubular support to acquire a circular cross-section before it is coated with dope. The rounding orifice may have a diameter in the range of about 1% to 10% less than the nominal diameter of the tubular braid. The barrel 312 is inserted in an outer barrel member 320 having a cylindrical base 325. The outer barrel 320 is provided with an inner axial chamber 322. Dope introduced into a port 321 of the nozzle 310 flows into the chamber 322 and then travels in the direction in which the braid is drawn through the bore 314. As the tubular braid is advanced out of the bore 314, it is coated with dope. The dope coated braid is led into a coagulating bath. In the coagulating bath, the dope solvent is driven out of the dope, for example by a non-solvent induced phase separation (NIPS) or thermally induced phase separation (TIPS) process. In the coagulation bath, the film forming polymer is converted into the membrane layer 14.

In the supporting structure 12, some of the filaments 228 comprise a first polymer and some or all of the filaments 228 comprise a second polymer. Some filaments 228 may be bi-component filaments, for example core—sheath filaments. Bi-component filaments may comprise the first polymer and the second polymer. Alternatively, bi-component filaments may comprise the second polymer and a third polymer. In a bi-component filament 228, the second polymer should be exposed to at least part, and preferably all, of the outer surface of the filament 228.

The first polymer is chosen primarily for its mechanical properties such as strength, ductility or flexibility, or for other considerations such as cost. The second polymer is chosen to be soluble or swellable in a solvent of the membrane dope, for example NMP. The second supporting polymer preferably also has a high affinity for the film forming polymer of the dope. Optionally, the second polymer may be the same as the film forming polymer in the membrane dope. The third polymer, if any, may be chosen for its mechanical properties, for other considerations such as cost, or for its compatibility with the second polymer in a bi-component filament.

The first polymer may be, for example, polyester (PET) or a co-polymer of polyester (coPET). Other possible first polymers include, for example, polyolefin, polyvinyl chloride (PVC), polyamide (PA), polypropylene (PP), polysulfone, polyestersulfone, polyphenylsulfone, polyacrylonitrile, cellulose and derivatives thereof. The second polymer may be PVDF. Other possible second polymers include, for example, polyvinylidene chloride, polyacrylonitrile (PAN) and its copolymers, polysulfone, polyethersulfone, polyphenylsulfone and derivatives thereof. Polymers that are listed both as possible first and second polymers may be suitable for use as homogenous filaments in combination with other filaments of another first polymer.

In a braided supporting structure 12, the filaments 228 are grouped together into yarns 230. Filaments 228 comprising the second polymer can be provided as a yarn 230 made up entirely of bi-component filaments comprising the second polymer or as a yarn of homogenous filaments of the second polymer. Alternatively, bi-component or second polymer filaments 228 can be mixed with filaments of the first polymer in one or more yarns 230. However, it is not clear at the time of writing this specification whether yarns 230 containing a mix of filaments comprising the second polymer and filaments of the first polymer can provide as much peel strength improvement as a yarn 230 made entirely of filaments of the second polymer for the same number of filaments comprising the second polymer. Accordingly, it is presently preferred for the supporting structure 12 to have one or more yarns 230 in which 50% or more, or all, of the filaments 228 are filaments comprising the second polymer.

Although optional, bi-component filaments 228 can have the advantage of decreasing the total amount of the second polymer in the supporting structure for a given surface area of the second polymer. This may be desirable because the second polymer has poor mechanical properties, or for other reasons such as its cost. Between 1 and 100% of the filaments 228 or yarns 230 can be filaments or yarns that comprise the second polymer. However, at least 50% of the cross-sectional area of the support is preferably made of the first polymer. By using bi-component fibers, even if all of the filaments 228 comprise the second polymer, 50% or more of the supporting structure 12 may be made of the first polymer.

In experimental examples, braid supported hollow fiber membranes were made with some or all of the yarns substituted with yarns made of bi-component fibers. Polyester (PET) was used as a first polymer because of its high tensile strength. In a reference membrane, the braid was made from yarns of PET filaments. PVDF was used for the membrane layer, chosen for its excellent chemical resistance. The primary solvent in the membrane dope was NMP. Although successful commercial membranes have been made in this way, PVDF has low adhesion to polyester and there have been some membrane peeling or de-lamination failures in the field. As will be discussed in more detail below, when one or more of the PET yarns were substituted with yarns made of filaments that comprise PVDF, the peel strength of the membrane improved. Less than half of the cross-sectional area of the braid was made of PVDF and so the membrane retained sufficient tensile strength. Replacing as few as 4% of the yarns in the braid with PET-PVDF core-sheath filaments provided an unpeelable membrane.

Figure 4:
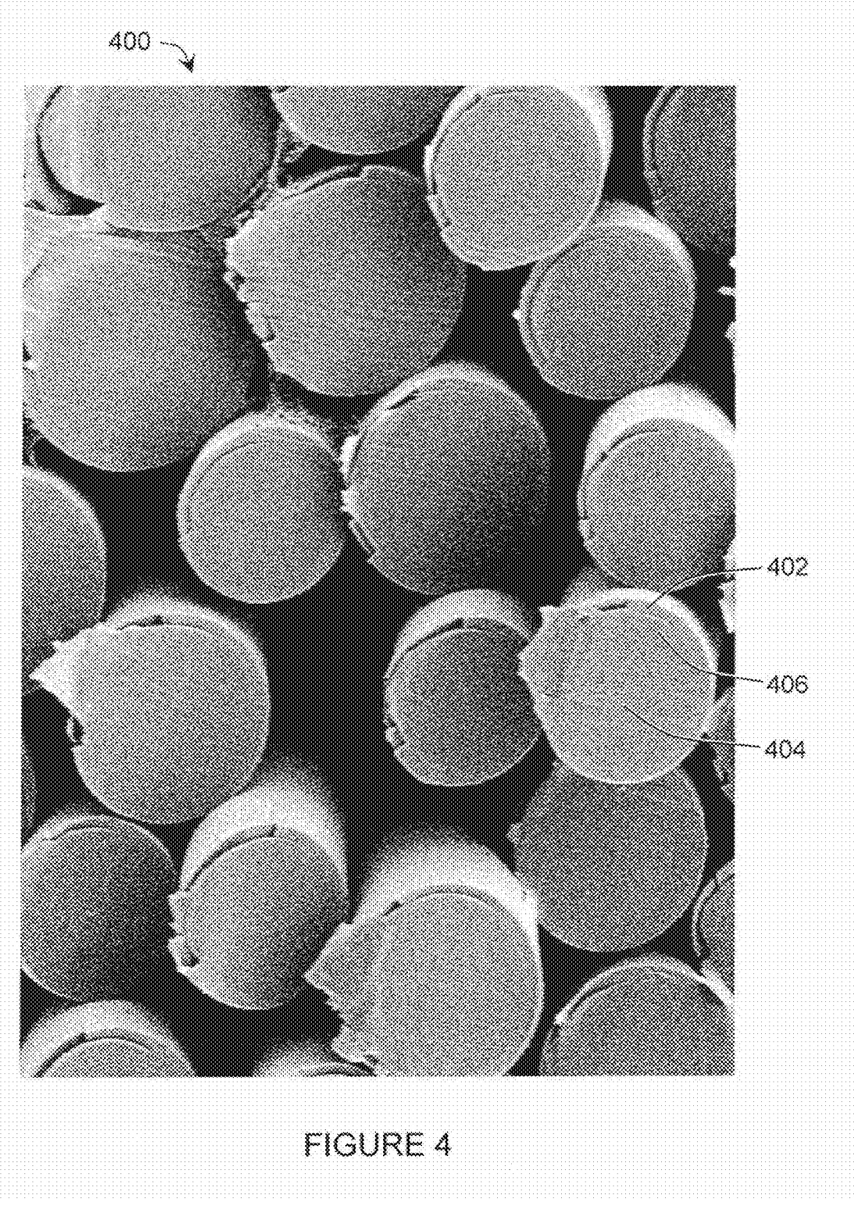
FIG. 4 is a scanning micrograph of a cross section of part of a yarn made of PET-PVDF core—sheath filaments.
Figure 5:
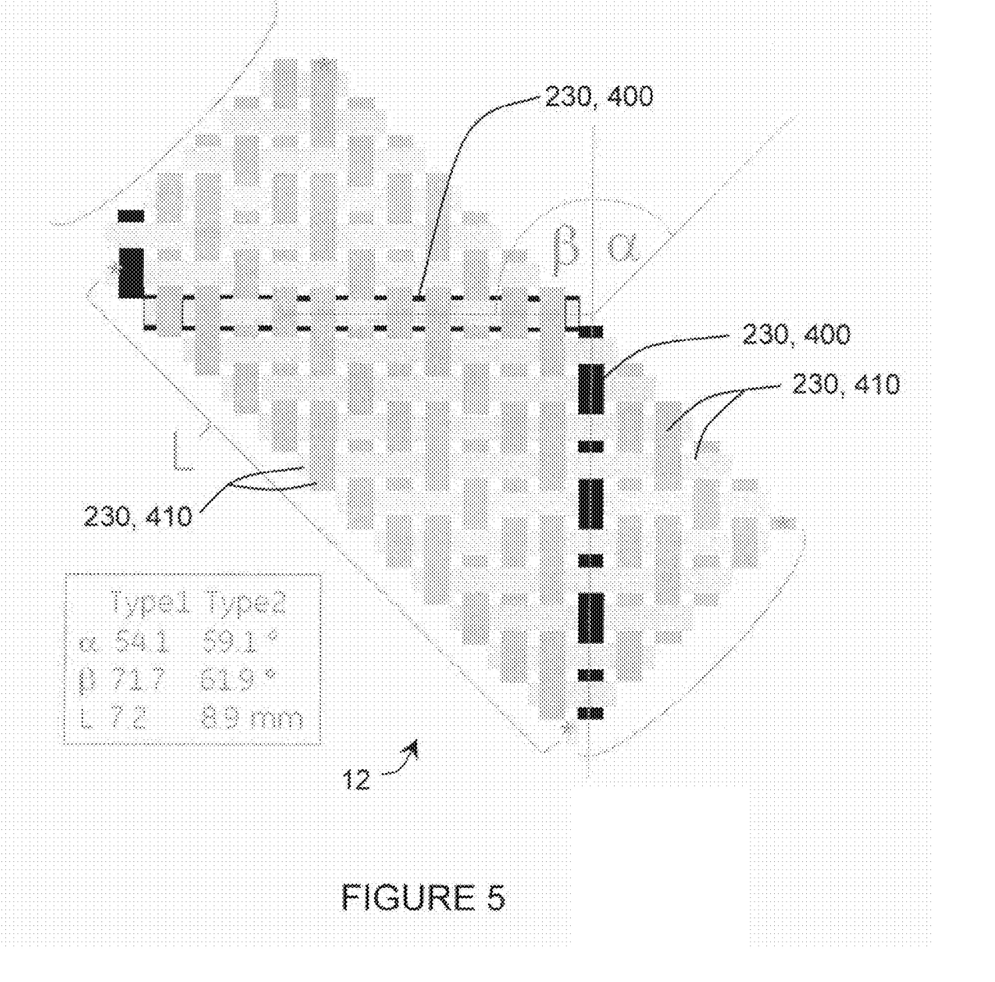
FIGS. 5 to 10 are schematic representations of a braided support in which some or all of the yarns have been substituted with one or more yarns made of PET-PVDF core-sheath filaments.

Each membrane in the experiment was supported on a tubular braid made in a regular braid pattern (one yarn floating over two adjacent yarns) with 24 carriers. The braid had 36-40 picks per inch. Two reference membranes were made using 400 and 460 dtex f96 flat polyester (PET) yarns. Two types of braid were used differing in various dimensions as indicated in FIG. 5. In the experimental membranes, new supporting structures were made in which one or more of the polyester yarns were substituted on the braider with yarns made up of core-sheath PET-PVDF bi-component filaments. The bi-component filaments were made of PVDF-coated PET, with a core diameter of 21 μm and an outer diameter of 26 μm. The substituted yarns were 467 dtex f72 (420 denier yarns made of 72 filaments) made up of bi-component filaments. A cross section of part of the bi-component yarn 400 is shown in FIG. 4. In the bi-component yarn 400 shown, the filaments 406 each have a PET core 404 and a PVDF sheath 402.

Figure 6:
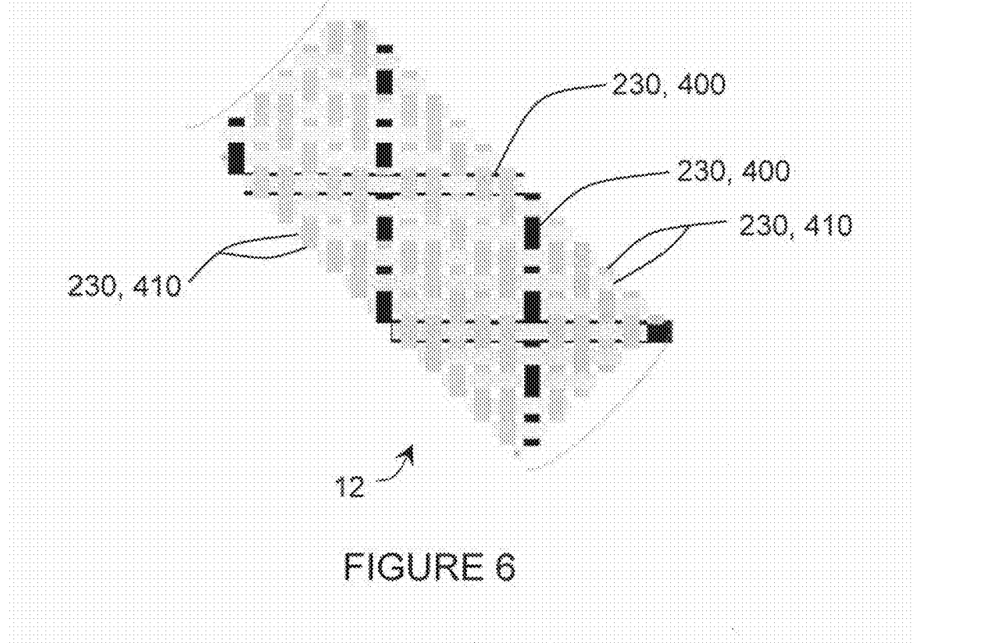
Figure 7:
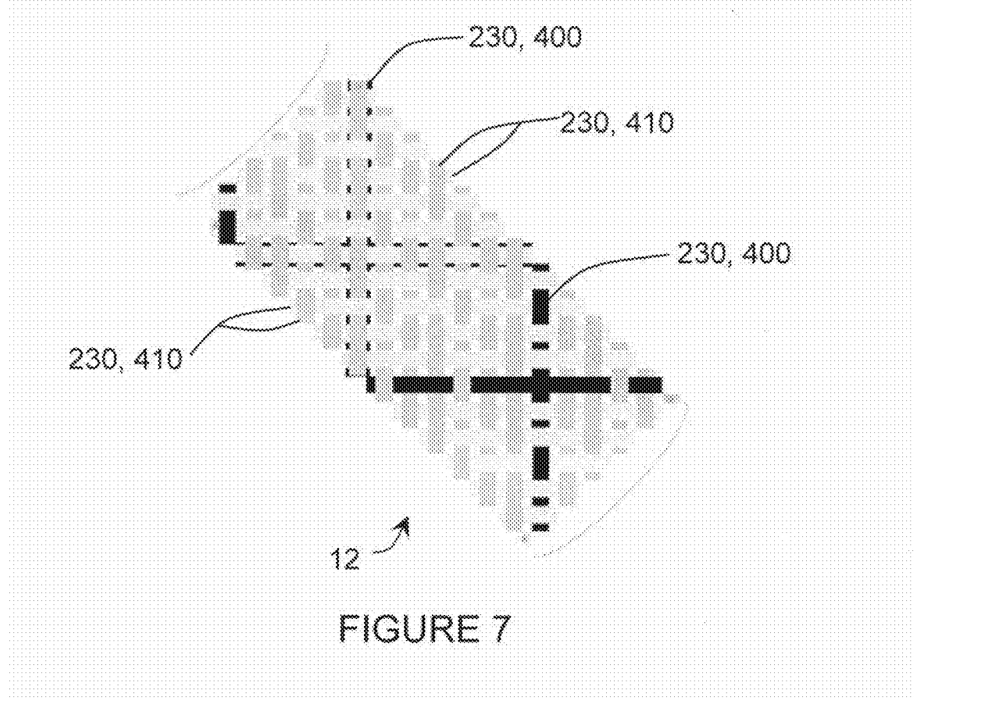
Figure 8:
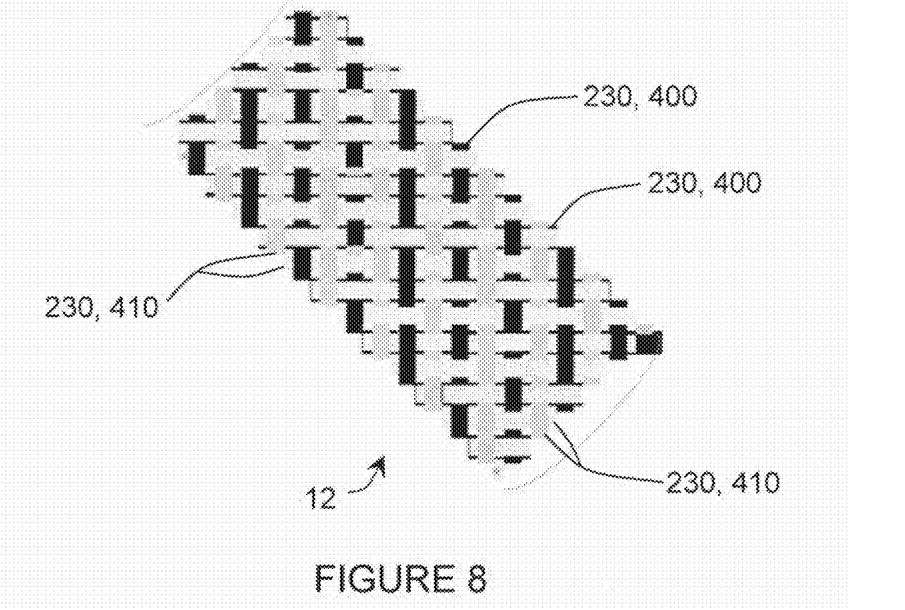
Figure 9:
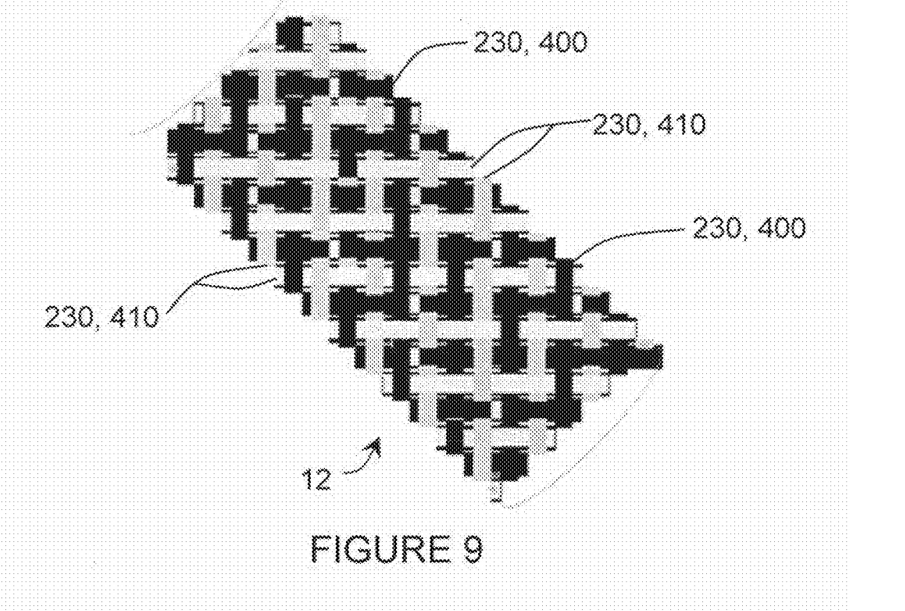
Figure 10:
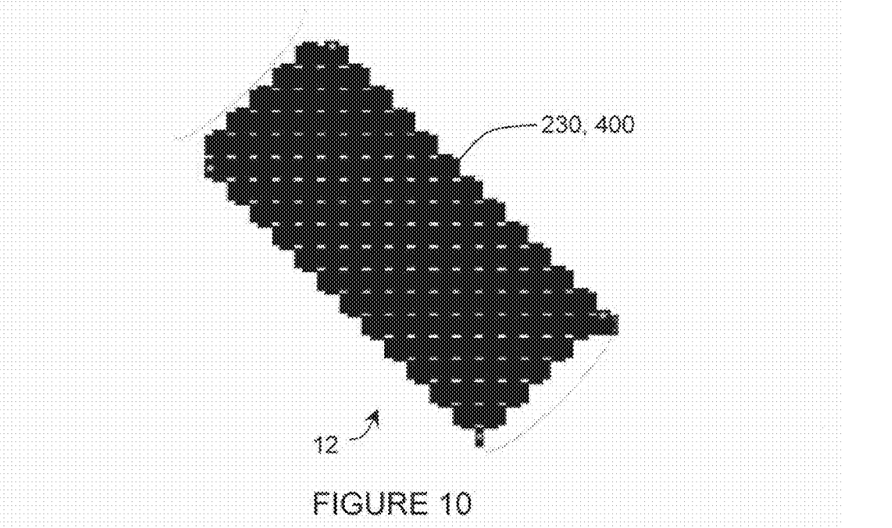

In different experiments, 1, 2, 6, 12 and 24 out of 24 carriers were replaced with bi-component filaments giving 4%, 8%, 25%, 50% and 100% replacement rates. The braiding machine had two counter rotating carrier systems. When two or more carriers were replaced in a single carrier system, the replaced carriers were spaced equally around the carrier system and produced a set of parallel helices. When 6 and 12 carriers were replaced, half of the replaced carriers were located on each of the carrier systems to produce a crossing pattern between the bi-component yarns and the PET yarns. The resulting braid structures are shown schematically in FIGS. 5 to 10. In these Figures, a black yarn is a PET-PVDF bi-component yarn on the front side of the braid. A yarn shown with a black border is a bi-component yarn on the back side of the braid. In the cases in which two carriers were replaced (8% substitution) with bi-component yarns, the bi-component yarns, in one case both replaced carriers were on one carrier system to produce a double parallel helical arrangement while in the other case one carrier was replaced on each carrier system to produce a cross-helical arrangement (FIGS. 6 and 7).

A membrane layer was cast on the braid samples using a dope based on PVDF in NMP to produce a loose ultrafiltration or tight microfiltration membrane. The membrane layer could not be peeled from any of the membranes with modified braids having at least one yarn of bi-component filaments. In particular, standard peel strength tests could not be performed because the membrane layer could not be removed from the supporting structure using standard test equipment.

A 'pull-off' test was performed after potting membrane samples into a solid block of polyurethane to obtain numerical data. The membrane length in the resin block was 30 mm. Since the polyurethane to membrane adhesion is higher than the membrane layer to supporting structure adhesion, delamination occurs at the boundary between the membrane layer and the supporting structure when a sufficient force is applied to membrane. This allowed the adhesion between the membrane layer and the supporting structure to be quantified by measuring the force required to pull the membrane out of the resin block. The properties of the membranes are summarized in Table 1.

TABLE 1

Composite filtration membrane properties based on two different braid supports

| | PVDF/PET yarn % [a] | 0% | 4% | 8% double helix | 8% cross helix | 25% | 50% | 100% |
|---|---|---|---|---|---|---|---|---|
| Type 1 | Fiber permeability [gfd/psi] [b] | 45 | 44 | n/a | n/a | 41 | 40 | 32 |
| | Defect pressure [psi] | 31 | 31 | n/a | n/a | 33 | 7 | 40 |
| | Peel strength, mean load [N] [c] | 0.19 | unpeelable | unpeelable | unpeelable | unpeelable | unpeelable | unpeelable |
| | Pull strength, max load [N] [d] | 25 | 31 | n/a | n/a | 62 | 67 | 93 |
| Type 2 | Fiber permeability [gfd/psi] [b] | 36 | 35 | 33 | 34 | 34 | 32 | 29 |
| | Defect pressure [psi] | 18 | 23 | 16 | 12 | 16 | 14 | 6 |
| | Peel strength, mean load [N] [c] | 0.21 | unpeelable | unpeelable | unpeelable | unpeelable | unpeelable | unpeelable |
| | Pull strength, max load [N] [d] | 37 | 44 | 50 | 54 | 81 | 110 | 136 |

[a] Percentage of PVDF/PET yarn blended in total yarn.
[b] 95 cm dead-end single fiber representing permeation in a Zeeweed ® 500 filtration module
[c] 6 mm contact perimeter
[d] 90 mm$^2$ contact area As indicated in Table 1, pull strength increased significantly with even one yarn of bi-component filaments. Pull strength continued to increase with more yarns of bi-component filaments. Membrane qualities were generally unchanged at low substitution rates, but permeability began to decline for substitution rates over 25%. However, a membrane with 50% bi-component yarns of the Type 1 pattern still had better permeability than a membrane with a PET braid of the Type 2 pattern.

Figure 11:
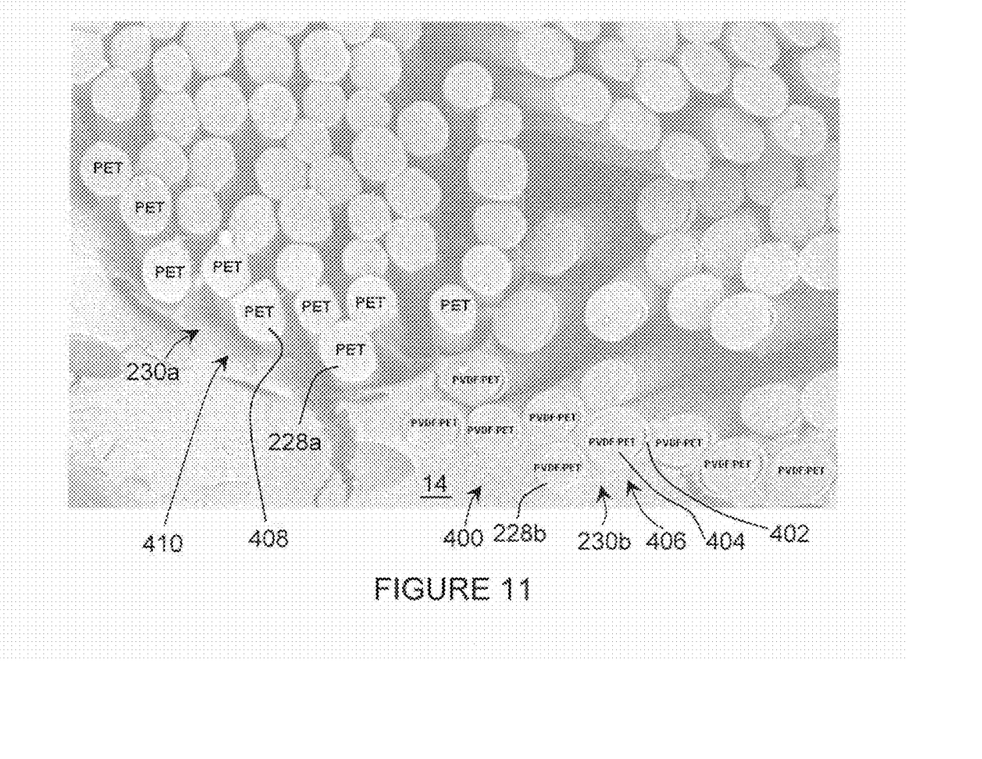
FIG. 11 is a scanning micrograph of a portion of a hollow fiber membrane coated on a tubular braid having a PET yarn and a PET-PVDF yarn blend.

Without intending to be limited by any particular theory, the improvement in peel strength appears to be based on two mechanisms. Firstly, the PVDF filaments have a high affinity for the PVDF dope, which causes enhanced penetration of the dope into the braid along the PVDF filaments. Secondly, the PVDF filaments partially or completely dissolve when exposed to the NMP which anchors the penetrating dope into the support structure. FIG. 11 shows that the membrane layer 14 of the finished membrane has limited adhesion to a first yarn 410, 230a made of PET filaments 408, 228a while it wets, surrounds and embeds the neighboring outer portion of a second yarn 230b, 400 made of PET-PVDF core-sheath filaments 406, 228b.

Although membranes as described above may be used in various applications, their increased mechanical robustness is particularly useful in immersed membrane bioreactors (MBRs). In MBRs, the membranes are frequently aerated intensely to scour the membranes and the membranes are mounted with excess length between potting headers to encourage them to sway when aerated. This inhibits fouling, but also causes stress where the membrane ends are fixed in the potting heads. Increased peel strength can be expected to reduce the rate of delamination failures of immersed membrane modules used in MBRs and in other harsh operating environments. The membranes described herein may be used in immersed, suction driven, ultrafiltration or microfiltration membrane modules such as ZeeWeed™ 500 series modules made by GE Water and Process Technologies.

We claim:

1. An immersed membrane module comprising braid supported hollow fiber membranes, the membranes comprising a braided supporting layer and a membrane layer, the membrane layer comprising PVDF, the supporting layer comprising a plurality of yarns, wherein some of the plurality of yarns are polyester yarns and others of the plurality of yarns comprise PVDF.

2. The immersed membrane module of claim 1 wherein the yarns comprising PVDF are made up essentially entirely of PVDF.

3. An immersed membrane module comprising braid supported hollow fiber membranes, the membranes comprising a braided supporting layer and a membrane layer, the membrane layer comprising PVDF, the supporting layer comprising yarns made at least in part of filaments comprising PVDF wherein the filaments comprising PVDF are bi-component filaments having a PVDF sheath.

4. The immersed membrane module of claim 3 wherein the bi-component filaments have a core of polyester.

* * * * *